US 6,578,780 B2

(12) United States Patent
Knauer et al.

(10) Patent No.: US 6,578,780 B2
(45) Date of Patent: Jun. 17, 2003

(54) METHOD FOR DISINTEGRATING SEWAGE SLUDGE

(75) Inventors: Jochen Knauer, Bad Homburg (DE); Jens Schmitt, Bad Schwalbach (DE); Jörg Schmitt, Bad Schwalbach (DE)

(73) Assignee: J.F. Knauer GmbH, Frankfurt (DE)

( * ) Notice: Subject to any disclaimer, the term of this patent is extended or adjusted under 35 U.S.C. 154(b) by 0 days.

(21) Appl. No.: 09/932,646

(22) Filed: Aug. 17, 2001

(65) Prior Publication Data

US 2002/0063094 A1 May 30, 2002

(30) Foreign Application Priority Data

Aug. 18, 2000 (DE) .......................... 100 40 545

(51) Int. Cl.[7] ........................ A47J 19/06; B02C 23/00
(52) U.S. Cl. .................... 241/2; 241/14; 241/29
(58) Field of Search ................ 241/2, 21, 29, 241/14

(56) References Cited

U.S. PATENT DOCUMENTS 4,860,957 A * 8/1989 Lidstrom ................ 241/29
4,985,149 A * 1/1991 Ohshima et al. ......... 241/21 X

FOREIGN PATENT DOCUMENTS

DE           197 19 638        * 1/1998

* cited by examiner

Primary Examiner—W. Donald Bray
(74) Attorney, Agent, or Firm—Sidley Austin Brown & Wood, LLP

(57) ABSTRACT

There is a method for the mechanical disintegration of biogenic sewage sludge, for which the sewage sludge, in an initial state, has microorganisms in the form of cells and a solid, which is formed essentially from aggregates of cells and suspended materials, and for which a disintegration process (3, 4) causes a destruction of aggregates and a destruction of cells. It is desirable to improve the disintegration. This is achieved in that, in a first disintegration step 3, primary destruction of aggregates and, in a subsequent, separate second disintegration step 4, primary destruction of cells is caused. Due to the use of two separate disintegration processes, an appreciable improvement in the disintegration is achieved, since fewer aggregates and more cells are supplied to the second disintegration process. The increased destruction of cells brings about the improvement in the disintegration.

11 Claims, 2 Drawing Sheets

Figure 1:
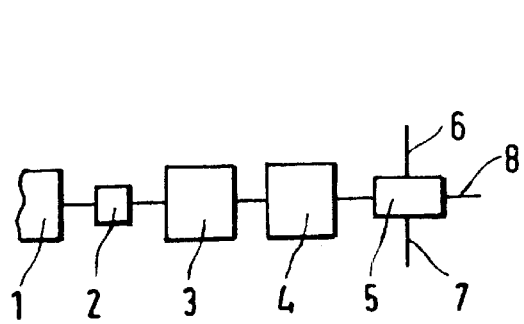

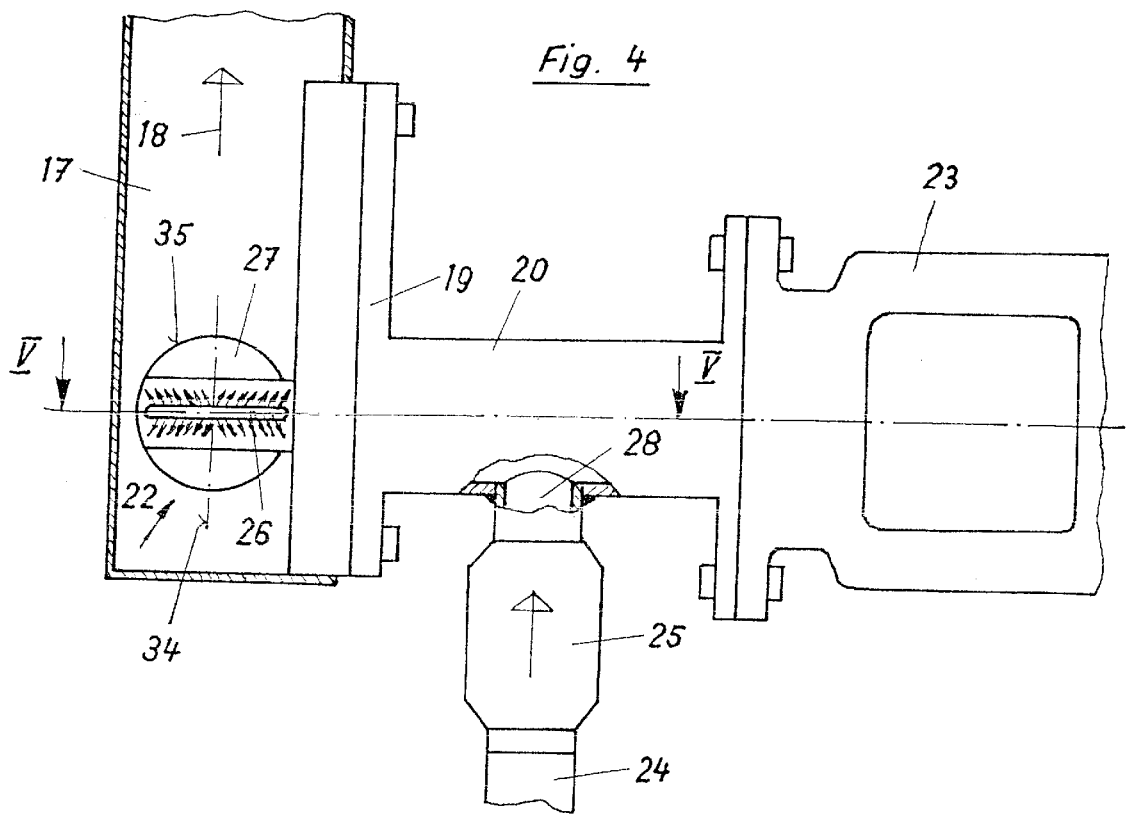
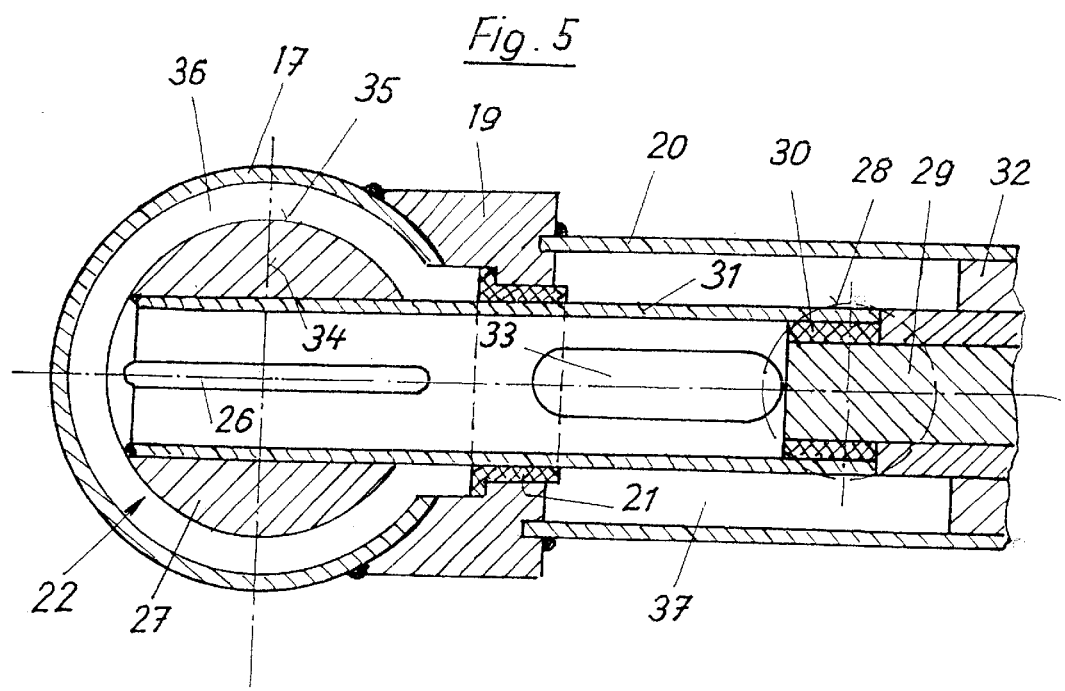

METHOD FOR DISINTEGRATING SEWAGE SLUDGE

FIELD OF INVENTION

The invention relates to a method for mechanically disintegrating biogenic sewage sludge, for which the sewage sludge, in an initial state, contains microorganisms in the form of cells and a solid, which is formed essentially by aggregates of the cells and suspended materials, and for which a disintegrating process causes destruction of aggregates and destruction of cells.

BACKGROUND INFORMATION AND PRIOR ART

The sewage sludge under discussion here consists of solid and liquid and is in a biological purification stage, in which organic components, which can be decomposed easily, are converted into inorganic end products such as water, carbon dioxide or nitrogen. In order to accelerate this process, microorganisms are mixed with the sewage sludge, sludge flakes or aggregates of very fine suspended material and microorganisms being formed. These aggregates comprise cells, formed by microorganisms. The effectiveness of the biological cleaning stage is improved by disintegrating the sewage sludge. The disintegration of the sewage sludge is understood to be the destruction of aggregates and cells.

In principle, the effects of a disintegration which effects can be measured, are:

the particle size distribution $Q_3(x)$ with the integral characteristic values of the particle size distribution, "average diameter xm" (assessment of the coarse portion) and "Sauter diameter xst" (assessment of the fines portion)

chemical oxygen demand (COD) gel esterase activities EA (extra cellular hydrolytic enzymes)

concentration of volatile organic acids as acetic acid equivalents.

The following is disintegrating equipment, suitable for use on a large, industrial scale: agitated ball mill, high-pressure homogenizer, ultrasonic homogenizer, high performance pulsed equipment and the lysate centrifuge. Each disintegration device brings about a disintegration process. In the case of a method, which has become known through practice and is of the type named above, only one disintegration process is applied to the sewage slugged, primarily a destruction of aggregate being brought about and the cells being destroyed only to a slight extent. In this way, disintegration results can be achieved, which lead to an improvement in the further treatment of the disintegrated sewage sludge.

OBJECT OF THE INVENTION

It is an object of the invention to create a method of the type named above, for which the disintegration is improved. The inventive method, which accomplishes this objective, is characterized in that primarily destruction of aggregates is brought about in a first disintegration process and primarily destruction of the cells in a subsequent, separate, second disintegration process.

SUMMARY OF THE INVENTION

Due to the use of two separate disintegration processes, a considerable improvement is achieved in the disintegration, since cells, rather than aggregates, are supplied to the second disintegration process. The increased destruction of cells brings about an improvement in the disintegration. The biogenic sewage sludge is not crude sewage sludge but one activated by microorganisms and the objective is to increase the efficiency of the microorganisms. The destruction of the cells leads to the release of carbon, which is nourishment for the microorganisms, which become increasingly effective due to the availability of the nourishment. During the first disintegration process, cells are destroyed directly only to a slight extent and enzymes, which destroy the cells, are released due to the destruction of aggregates. Cells are destroyed directly and to an appreciable extent by the second disintegration process itself. The disintegration process is a treatment process primarily only for the disintegration of sewage sludge and not for any other type of treatment.

Because of the inventive method, the amount of residual sludge, finally remaining, is decreased markedly. The inventive method follows a decomposition stage, which is aerobic or anaerobic and during which gas in produced. The decomposition stage preferably is a putrefaction basin. Because of the inventive method, the yield of gas is increased and the quality of the residual sludge, which is a decomposed organic product, is improved. In the case of the inventive method, the improvement in the disintegration is achieved by increasing the available carbon content. The carbon content of the sewage sludge is reflected by the measurable chemical oxygen demand (COD). If there is primarily destruction of aggregates in the first disintegration process, then this means that at least 60% and preferably at least 80% of aggregates, which can be detected at the inlet of the first disintegration process, is destroyed at the outlet of the first disintegration process. If there is primarily destruction of cells in the second disintegration step, then this means that at least 30% of the cells, which can be detected at the outlet of the second disintegration process, are destroyed at the outlet of the second disintegration process.

As a rule, it is difficult to measure the content of aggregates and cells in the sewage sludge directly. For this reason, it is appropriate to measure the carbon content chemical oxygen demand of the sewage sludge. It is particularly appropriate and advantageous if the carbon content is up to 200 mg/L of COD gel at the inlet of the first disintegration process, up to 400 mg/L of COD gel at the outlet of the first disintegration process or at the inlet of the second of the second disintegration process and up to 2,000 mg/L of COD gel at the outlet of the second disintegration process. Within the scope of these COD values, the inventive method proceeds in a practically advantageous manner.

The inventive method can be realized with two similar processes, two similar disintegration devices being provided in series. It is particularly appropriate and advantageous if the second disintegration process differs from the first disintegration process. The first process can be directed to the destruction of aggregates and the second to the destruction of molecules. Accordingly, the inventive method can be carried out better. Especially if the two disintegration processes are different in their nature and mode of action, there is an unexpectedly large improvement in the disintegration.

It is particularly appropriate and advantageous if the first disintegration process is of a type, in which the sewage sludge is stressed with severing parts and/or if the second disintegration process is of a type, in which the sewage sludge is stressed with energy fields. The destruction of aggregates, which are larger than cells, can be brought better with the help of severing parts; for example, agitated ball mills and lysate centrifuges work with severing parts. After the first disintegration process by means of severing parts, at least 90% and frequently up to 99% of the aggregates are destroyed. The destruction of cells, which are smaller than aggregates, can be brought about better with the help of energy fields, such as high performance pulsed equipment and ultrasonic homogenizers.

It is particularly appropriate and advantageous if, for the first disintegrating process, a rotating wing device is used and/or if, for the second disintegrating process, an ultrasonic homogenizer is used. The rotating wing device, which will be described in greater detail in the following, brings about the disintegration of aggregates in an improved manner. The ultrasonic homogenizer, which is known, brings about the disintegration of cells in an improved manner. The combined use of the rotating wing device and of the ultrasonic homogenizer is associated with a further improvement in the disintegration due to the increase in the available carbon content. The ultrasonic homogenizer is a high-performance ultrasonic device and the rotating wing device is a rotating turbulence disintegrator.

For a two-step disintegration installation with a rotating wing device and an ultrasonic homogenizer, the following carbon values are obtained:

inlet of the two-step rotating wing installation—100 mg/L of COD gel, outlet of the two-step rotating wing installation—200 mg/L of COD gel, inlet of the 2-step ultrasonic installation—200 mg/L of COD gel, outlet of the 2-step ultrasonic installation—1072 mg/L of COD gel, only ultrasonic installation in a single step operation—COD increased from 100 mg/L to 456 mg/L.

Experiments have shown that, by combining the energy field disintegration process with the preceding severing parts disintegration process, there is a far-reaching effect in regard to the change in the particle size. The comminuting effect of the severing parts disintegration process on the sewage sludge, which can be recognized clearly in photographs, taken through a light microscope, evidently improves the disintegrating action of the energy field disintegration process. The mechanical disintegration of the sewage sludge by the severing parts leads to an increase in the specific surface area, so that an immediate effect of the energy field input on the already comminuted sludge particles can take place. The synergistic effects, which resulted from the combination of the two disintegrating processes, accordingly can be demonstrated by means of the material-releasing, enzyme-stabilizing and aggregate structure-changing effect of the input of energy the sewage sludge obtained last.

It is particularly appropriate and advantageous if the sewage sludge is heated to at least 20° C., but not to more than 45° C. before the first disintegration process. The disintegration can be improved appreciably by heating the heating the biogenic sewage sludge. The upper limit of the temperature is determined by the harmful effect on enzymes.

The invention is discussed in greater detail in the following by means of the drawing, in which FIG. 1: diagrammatically shows an apparatus for mechanically disintegrating sewage sludge, FIG. 2: diagrammatically shows an aggregate of the sewage sludge of the apparatus of FIG. 1, FIG. 3: shows a graphic representation of the measurement results with the apparatus of FIG. 1, FIG. 4: shows a diagrammatic plan view, partially prized open, of the rotating wing device of the apparatus of FIG. 1, FIG. 5: shows a section along the line V—V of FIG. 4, on a larger scale and FIG. 6: diagrammatically shows a second embodiment of a rotating wing device.

The apparatus of FIG. 1 comprises a feeding device 1 for a biogenic sewage sludge in a pre-heated, the pre-heating of the sewage sludge having an advantageous effect on the disintegration. The sewage sludge is worked up by the addition of a flocculant and consists of liquid, which is mostly water and in which there are foam flakes or aggregates. This sewage sludge is pumped further by a pump 2, which already brings about a destruction of aggregates, which, however is disregarded in the case of the method under discussion here. The solids of the sewage sludge leaving the pump, therefore comprise aggregate, microorganisms in the form of cells and free very fine suspended materials. This sewage sludge is supplied to a first disintegrating device 3 and then to a second disintegration device 4. This is followed by a decomposition stage 5, which comprises a putrefaction basin and emits gas over an outlet 6 and delivers liquid over an outlet 7 and residual sludge over an outlet 8. The first disintegration device 3 is a rotating wing device and the second disintegration device 4 is an ultrasonic homogenizer.

Figure 2:
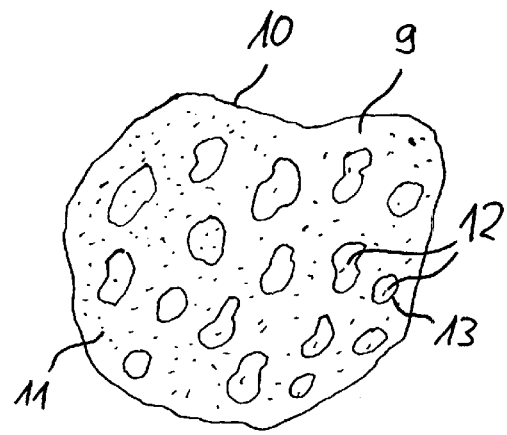

The sewage sludge, which is supplied to the first disintegrating device 3, contains suspended materials, microorganisms, liquid, flocculant and aggregate 9, as shown in FIG. 2. The aggregate 9 is surrounded by a skin, in which liquid, suspended material 11 and cells 12, which are formed by microorganisms and, in each case are surrounded by a skin 13, are contained. The aggregates 9 and the cells 12 are destroyed to varying extents in the disintegrating equipment 3, 4.

Figure 3:
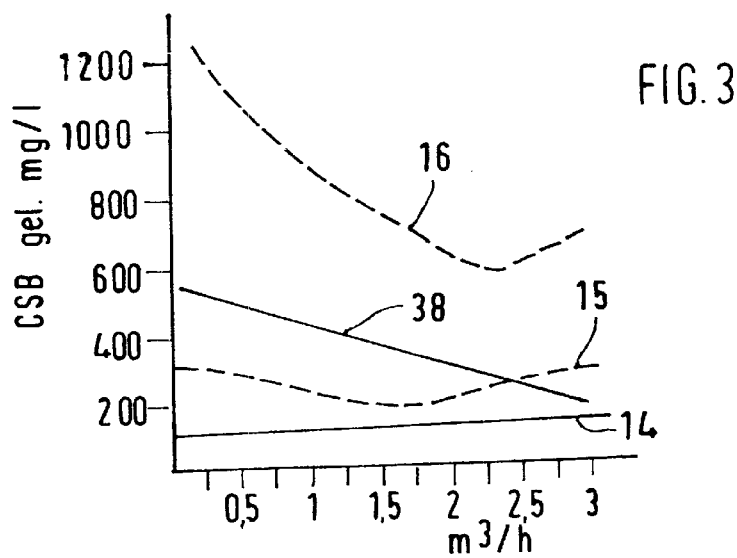

The graphic representation of FIG. 3 gives the COD value in a curve 14 at the inlet of the first disintegrator device 3, the COD value at the outlet of the first disintegrator device 3 in a curve 15 and the COD value of the outlet of the second disintegrator 4 in a curve 16 and, moreover, as a function of the throughput of the sewage sludge. A curve 38 shows the course of the COD value after a single disintegration by means of ultrasound.

The mechanical stressing of the sewage sludge by the first disintegrator device leads to the shattering of the compact aggregates and thus to an increase in the disintegrating effect of the second disintegration device. The positive effect of the combination of a first disintegrating device and a second disintegrating device is shown in FIG. 3. In comparison to a single disintegrating action of the second disintegrating device, an increase in the COD release is achieved by connecting the first disintegrating device in series. At the same time, the disintegrating performance of the first disintegrating device with respect to the COD release moves independently of the sludge throughput to a level, which corresponds approximately to twice the value of the starting level. In spite of the comparatively low disintegrating performance of the first disintegrating device, the combination with the second disintegrating device results in an improvement in the form of an increased COD release, which cannot be accounted for only by a simple addition of the disintegration effect of the first and second disintegration devices. By connecting a first disintegrating device in series, an increase in the total COD by about 100 mg/L to about 200 mg/L is achieved. The total COD increase after first and second disintegrating devices, in comparison to a single disintegration (increase by 150 to 456 mg/L), on the other hand, is between 420 and 1072 mg/L; in other words, it is not increased only by the 100 mg/L, which is achieved with the first disintegrating device. Evidently, the mechanical pretreatment of the sewage sludge with the first disintegration device improves the ability of the second disintegration device to bring about disintegration.

The rotating wing device of FIGS. 4 and 5 is provided at a connecting space 17, which is constructed as a sludge pipe, into which a sewage sludge flows as indicated by arrow 18. The device is mounted by means of an elongated flange 19 to the connecting space 17 and, outside of the connecting space, has a dome-shaped chamber 20, which protrudes away from the flange 19. A head 22, which can be rotated by means of a driving mechanism 23, which is mounted at the other end of the dome-like chamber 20 and is constructed as an electric motor, protrudes from the dome-like chamber 20 into the connecting space 17. At 28, a supply line 24 for the sewage sludge, in which there is a non-return valve 25, discharges at the dome-like chamber 20. The head 22 forms slot-like openings 26 and carries strip-shaped wings 27.

A shaft extension 29, coming from the driving mechanism 23, carries over a bushing 30 a pipe 31 and a floating ring seal 32, which embraces the shaft extension 29, is provided in the front wall of the dome-like chamber 20. The pipe 31 has elongated openings 33, through which the sewage sludge passes from the dome-like into the pipe. A connecting space 37, which surrounds the pipe 31 and from which the sewage sludge reaches the openings 33, is present in the dome-like chamber 20. The pipe 31 passes through a plain bearing bush 21, seated in the flange 19, into the connecting space 20 and is converted there, without a change in material, into the head 22, which is constructed in tubular fashion. A plane of rotation 34, which is indicated by a broken line, is assigned to the head 22. Each head 27 forms a circularly curved edge 35, which, with appropriate attitude of the wing, forms the boundary of a gap 36 to the connecting space 17, which is circular in cross section.

The special effect of the rotating wing device, which serves predominantly for aggregate destruction and particle size distribution, take place due to shear, acceleration and impact forces. These forces are transferred from the device to the biogenic sewage sludge in the following way: shear at the inlet and outlet of the longitudinal grooves into and out of the rotation shaft; acceleration forces at the shaft outlet centrifugally to the housing; impact forces by the wings in the sludge housing of the device. Furthermore, with the COD parameter as a characteristic quality, it is possible to make as statement concerning the proportion of the individual forces in the total result. Since only shear forces are exerted on the biogenic sludge by the hollow shaft, it can be concluded that the ratio of shear forces to acceleration and impact forces is 1:3, that is, 30% of the effect of a rotating wing device is achieved by shear forces and 70% by acceleration and impact forces.

Figure 6:
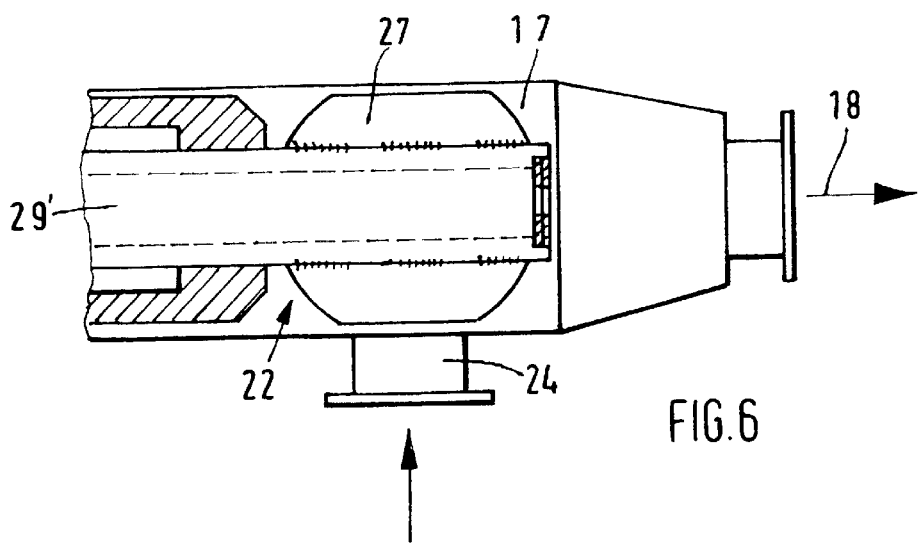

In its structure and mode of action, the rotating wing device of FIG. 6 is simplified in comparison to that of FIGS. 4 and 5 in that it does not have the slot-like, elongated openings 26, 33. A supply pipeline 24 brings the sewage sludge into a connecting space 17, from which the sewage sludge drains as indicated by arrow 18. In the connecting space 17, a head 22 at a shaft 29 rotates and the head forms wings 27. The 90° deflection of the flow of the sewage sludge from the supply pipeline 24 into the connecting space 17 and the treatment of the sewage sludge with the wings brings about appreciable severing-parts disintegration.

What is claimed is:

1. A method for mechanical disintegration of biogenic sewage sludge having, in an initial state, microorganisms in form of cells and a solid which is formed essentially from aggregates of cells and suspended material, the method comprising the steps of primarily destructing the aggregates in a first disintegration process; and, thereafter, primarily destructing the cells in a separate, second disintegration process.

2. The method of claim 1, wherein carbon content amounts up to 200 mg/L of COD gel at an inlet of the first disintegration process, up to 400 mg/L of COD gel at one of an outlet of the first disintegration process and an inlet of the second disintegration process, and up to 2000 mg/L of COD gel at an outlet of the second.

3. The method of claim 1, wherein the second disintegration process is not of a same type as the first disintegration process.

4. The method of claim 1, wherein the first disintegration process stresses the sewage sludge with severing parts.

5. The method of one of claim 1, wherein the second disintegration process stresses the sewage sludge with energy fields.

6. The method of claim 4, wherein a rotating wing device is used for the first disintegration process.

7. The method of claim 5, wherein an ultrasonic homogenizer is used for the second disintegration process.

8. The method of claim 1 wherein the sewage sludge, before the first disintegration process, is heated to at least 20° C. but not more than 45° C.

9. A method of claim 1, wherein at least 60% of the aggregates is destructed in the first disintegration process.

10. A method of claim 9, wherein at least 80% of the aggregates is destructed in the first disintegration process.

11. A method of claim 1, wherein at least 30% of the cells is destructed in the second disintegration process.

* * * * *